United States Patent [19]
Nishimoto et al.

[11] Patent Number: 4,963,426
[45] Date of Patent: Oct. 16, 1990

[54] HEAT-SHRINKABLE LAMINATED FILM

[75] Inventors: Yoshiharu Nishimoto; Kengo Yamazaki, both of Iwaki, Japan

[73] Assignee: Kureha Kagaku Kogyo Kabushiki Kaisha, Tokyo, Japan

[21] Appl. No.: 316,763

[22] Filed: Feb. 28, 1989

[30] Foreign Application Priority Data

Mar. 4, 1988 [JP] Japan ................... 63-51187

[51] Int. Cl.$^5$ .............. B32B 27/32; B32B 27/34; B32B 27/08
[52] U.S. Cl. .................. 428/213; 428/476.1
[58] Field of Search ............... 428/474.4, 476.1, 213

[56] References Cited

U.S. PATENT DOCUMENTS

| | | | |
|---|---|---|---|
| 4,361,628 | 11/1982 | Krueger et al. | 428/475.8 |
| 4,695,491 | 9/1987 | Kondo et al. | 428/34.9 |
| 4,734,327 | 3/1988 | Vicik | 428/474.4 X |
| 4,735,855 | 4/1988 | Wofford et al. | 428/474.4 X |
| 4,764,406 | 8/1988 | Hisazumi et al. | |
| 4,784,863 | 11/1988 | Lustig et al. | 428/36.7 X |
| 4,818,588 | 4/1989 | Okabe et al. | 428/457 X |

FOREIGN PATENT DOCUMENTS

| | | |
|---|---|---|
| 0216094 | 3/1987 | European Pat. Off. . |
| 0252597 | 2/1988 | European Pat. Off. . |
| 0277839 | 4/1988 | European Pat. Off. . |
| 0278695 | 11/1988 | European Pat. Off. . |
| 52-115880 | 9/1977 | Japan . |
| 56-136365 | 10/1981 | Japan . |

*Primary Examiner*—George F. Lesmes
*Assistant Examiner*—Elizabeth M. Cole
*Attorney, Agent, or Firm*—Nixon & Vanderhye

[57] ABSTRACT

A heat-shrinkable laminated film suitable for a packaging film, having at least two layers of a mixed aliphatic polyamide resin layer (A) of 55 to 90 wt. % of an aliphatic polyamide resin with a crystalline melting point of 175° to 240° C. and 45 to 10 wt % of an aliphatic polyamide resin with a crystalline melting point of from not less than 120° C. to less than 175° C.; and a mixed resin layer (B) of a saponified ethylene-vinyl acetate copolymer as the main constituent. These laminated films have excellent gas barrier properties, stretchability, uniform heat-shrinkability and useful dimensional stability.

7 Claims, No Drawings

HEAT-SHRINKABLE LAMINATED FILM

BACKGROUND OF THE INVENTION

The present invention relates to a heat-shrinkable laminated film comprising a mixed aliphatic polyamide resin layer (A) comprising aliphatic polyamide resins mixed with each other in a specific ratio and a mixed resin layer (B) comprising a saponified ethylene-vinyl acetate copolymer (hereinunder referred to as "EVOH resin") as the main constituent.

Most fatty foods such as raw meat and processed meat have irregular shapes and are not uniform in size. For packaging such foods having various shapes, a shrink packaging method using heat-shrinkable films is industrially adopted. General procedures of this method consist of the steps of inserting an object into a bag of a film, removing the air from the bag under vacuum, sealing the opening part of the bag, and heating the bag so as to heat shrink the film and bring the film into close contact with the contents, thereby obtaining a package with a fine appearance. In this method, the heat treatment also serves to sterilize the contents and is ordinarily carried out at a temperature of 70° to 120° C.

A film used for such shrink packaging must be excellent in its gas barrier property and adhesiveness, and be sufficiently shrunk when heated with hot water or hot air of 70° to 120° C.

As such a shrink packaging film, an EVOH resin film having a high gas barrier property is considered to be suitable. However, an EVOH resin film having an excellent gas barrier property is inferior in a stretchability.

To eliminate this defect, various methods have been proposed.

For example, a composite film obtained by bringing an EVOH resin film into close contact with a polyamide resin film and stretching the thus-laminated film (Japanese patent application Laid-Open (KOKAI) No. 52-115880 (1977) and, a laminated film consisting of a polyolefin layer, a polyamide resin layer and an EVOH resin layer (Japanese patent application Laid-Open (KOKAI) No. 56-136365 (1981)) have been proposed.

However, the mere lamination of an EVOH resin layer and a polyamide resin layer does not always produce a film which has satisfactory stretchability and uniform heat-shrinkability.

In addition, although the lamination of a polyamide resin layer is necessary for obtaining the required heat resistance, since the dimensional stability is deteriorated thereby, heatsetting by, for example, heat treatment is required, which may lower the workability and production yield.

Accordingly, a laminated film of a polyamide resin layer and an EVOH resin layer not only having a high gas barrier property and heat resistance but also being excellent in stretchability, heat-shrinkability and dimensional stability is now in demand.

The present inventors proposed a laminated film comprising of a mixed resin layer of a polyamide resin and an EVOH resin and a resin layer containing an EVOH resin as the main constituent in U.S. patent application No. 148,569 now U.S. Pat. No. 4,911,979.

As a result of further study undertaken by the present inventors in order to improve the stretchability, heat-shrinkability and dimensional stability of a film while maintaining the high gas barrier property of an EVOH resin and heat resistance of a polyamide resin, it has been found that when a mixed resin containing an EVOH resin as the main constituent is used in order to improve the stretchability of the EVOH resin itself, the gas barrier property and the stretchability are compatible to a certain extent, and that a laminated film having both uniform heat-shrinkability and excellent dimensional stability as well as stable processability and very improved stretchability are obtained by laminating a mixed resin layer containing an EVOH resin as the main constituent and a polyamide resin layer obtained by mixing polyamide resins having specific crystalline melting points in a specific ratio. The present invention has been achieved on the basis of this finding.

SUMMARY OF THE INVENTION

An object of the present invention is to provide a laminated film having excellent stretchability, uniform heat shrinkability, excellent gas barrier properties and excellent dimentional stability.

Another object of the present invention is to provide a heat-shrinkable laminated film comprising at least two layers of a mixed aliphatic polyamide resin layer (A) comprising 55 to 90 wt % of an aliphatic polyamide resin having a crystalline melting point of 175° to 240° C. and 45 to 10 wt % of an aliphatic polyamide resin having a crystalline melting point of from not less than 120° C. to less than 175° C. and a mixed resin layer (B) comprising an EVOH resin as the main constituent.

DETAILED DESCRIPTION OF THE INVENTION

A mixed aliphatic polyamide resin layer (A) constituting the present invention is a mixed resin layer comprising of 55 to 90 wt % of an aliphatic polyamide resin having a crystalline melting point of 175° to 240° C. (hereinunder referred to as "PA resin-1") and 45 to 10 wt % of an aliphatic polyamide resin having a crystalline melting point of from not less than 120° C. to less than 175° C. (hereinunder referred to as "PA resin-2").

As the PA resin-1, nylon 6, nylon 9, nylon 69, nylon 610, nylon 612, nylon 11, nylon 12, nylon 6-66, nylon 6-69, nylon 6-12, etc. are usable. Among these, polyamide resins having a crystalline melting point of 195° to 240° C., namely, nylon 6, nylon 69, nylon 610, nylon 612, nylon 6-66, nylon 6-69 and nylon 6-12 are preferable from the point of view of heat resistance.

A PA resin-1 having a crystalline melting point above 240° C. has a high crystallinity which is apt to deteriorate the stretchability. As the PA resin-1, a mixture of PA resin-1 may be used so long as the crystalline melting point is in the specified range. The same is applicable to the PA resin-2.

As the PA resin-2, nylon 6-69, nylon 6-12, nylon 6-66-610 and nylon 6-66-610-12, etc. are usable. Among these, polyamide resins having a crystalline melting point of 120° to 160° C. are preferable from the point of view of stretchability, heat-shrinkability and dimensional stability.

A PA resin-2 having a crystalline melting point of less than 120° C. is inferior in stretchability and heat resistance.

The EVOH resin used for the mixed resin layer (B) is a partially saponified ethylene-vinyl acetate copolymer. The ethylene content in the EVOH resin is 25 to 49 mol %, preferably 35 to 49 mol %, and the saponification degree is not less than 95 mol %. If the ethylene content exceeds 49 mol %, the gas barrier property is deteriorated, while if the ethylene content is less than 25 mol %, the stretchability becomes inferior. In order to obtain uniform stretchability, the ethylene content is preferably not less than 35 mol %.

The layer (A) comprises a mixed resin of 55 to 90 wt % of a PA resin-1 and 45 to 10 wt % of a PA resin-2, preferably of 55 to 75 wt % of a PA resin-1 and 45 to 25 wt % of a PA resin-2. If the content of the PA resin-1 exceeds 90 wt %, it is impossible to obtain uniform heat-shrinkability and dimensional stability. On the other hand, if the content of the PA resin-1 is less than 55 wt %, it is impossible to obtain heat resistance and uniform heat-shrinkability.

The layer (B) comprises a mixed resin containing an EVOH resin as the main constituent. In consideration of the gas barrier property and stretchability, the layer (B) is preferably, for example, a mixed resin layer comprising 70 to 99 wt %, preferably, 85 to 97 wt % of an EVOH resin and 1 to 30 wt %, preferably 3 to 15 wt % of a resin selected from the group consisting of elastomers such as a polyester elastomer (e.g., a block copolymer type thermoplastic polyester elastomer) and a polyamide elastomer (e.g., a polyester amide elastomer and a polyether amide elastomer), an ethylene-vinyl carboxylate copolymer such as ethylene-vinyl acetate copolymer (hereinunder referred to as "EVA"), an ethylene acrylate copolymer, an ethylene-acrylic acid copolymer and an acid-modified graft polymer thereof. As the resin mixed with an EVOH resin, polyester elastomer, an ethylene-vinyl carboxylate copolymer containing 75 to 95 mol % of ethylene and an ethylene-acrylate copolymer containing 75 to 95 mol % of ethylene are preferable. When an acid-modified graft polymer of these copolymers or an ethylene-acrylic acid copolymer is used, attention must be paid to the extruding processability. The above-described resins are comparatively easy to mix with an EVOH resin. If the content of an EVOH resin is less than 70 wt %, the gas barrier property is insufficient, while single use of an EVOH resin is apt to make the stretchability insufficient for obtaining uniform heat-shrinkability. The use of 85 to 97 wt % of an EVOH resin is suitable for obtaining a gas barrier property and uniform stretchability.

A heat-shrinkable laminated film of the present invention comprises at least the layer (A) and the layer (B), and the numbers of the layers (A) and (B) each may be two or more. When the numbers of the layers (A) and (B) constituting the laminated film are respectively two or more, the resin composition of each layer may be either the same or different. However, in terms of workability and uniform layer thickness, it is preferable that the laminated film consists of only one layer (A) and one layer (B).

The thickness of a laminated film of the present invention consisting of the layers (A) and (B) is preferably 6 to 30 μm in terms of flexibility.

The thickness of a laminated film comprising the layers (A) and (B) and a thermoplastic resin layer is preferably 15 to 120 μm.

It is preferable that the thickness of the layer (A) is larger than that of the layer (B), and if the numbers of the layers (A) and (B) constituting the laminated film are respectively two or more, it is preferable that the total thickness of the layers (A) is larger than the total thickness of the layers (B).

If the thickness of the layer (A) is smaller than that of the layer (B), the stretchability of the film is sometimes deteriorated. The thickness of the layer (A) is preferably 1.1 to 3 times as large as that of the layer (B).

The laminated film of the present invention requires at least two layers of the layer (A) and the layer (B), and it is possible to laminate another thermoplastic resin layer thereon in order to provide the film with various properties. As the thermoplastic resin, an olefin resin is preferable in terms of the extrusion property, stretchability and sealing property.

As the olefin resin are preferable a copolymer of ethylene and a vinyl ester monomer such as an EVA; a copolymer of a monomer selected from among an aliphatic unsaturated carboxylic acid and an aliphatic unsaturated carboxylate with ethylene, e.g., a copolymer of a monomer selected from among acrylic acid, acrylate, methacrylic acid, methacrylate with ethylene; an ionomer resin; a linear low-density polyethylene (hereinunder referred to as "LLDPE"), a mixed resin of an LLDPE and an EVA; a very low-density polyethylene (hereinunder referred to as "VLDPE") having a density of not more than 0.91 and a Vicat softening point (measured with ASTM D-1525) of not higher than 90° C., preferably not higher than 80° C.; a mixed resin of such a VLDPE and a small amount of LLDPE; a crystalline propylene-ethylene random copolymer, a mixed resin of a crystalline propylene-ethylene random copolymer and a polypropylene elastomer (hereinunder referred to as "PP+α"); and a mixed resin of a crystalline propylene-ethylene random copolymer and a VLDPE preferably having a Vicat softening point of not higher than 80° C. As the EVA, those containing 3 to 19 wt % of vinyl acetate are preferable. In a mixed resin of an LLDPE and an EVA, the content of the EVA is preferably at least 55 wt % from the point of view of the stretchability. As the LLDPE, a copolymer of ethylene with a small amount of an α-olefin having 4 to 18 carbon atoms such as butene-1, pentene-1, 4-methyl-pentene-1, hexene-1 and octene-1 which has a crystalline melting point of 118° to 125° C. is preferable. As the ionomer resin, an ion cross-linked ionomer is used which is obtained by neutralizing a part of the anions of a copolymer of an α-olefin such as ethylene and propylene and an unsaturated carboxylic acid such as acrylic acid, methacrylic acid and maleic acid or a partially saponified copolymer of said olefin and an unsaturated carboxylate with metal ions such as $Na^+$, $K^+$, $Mg^{2+}$, $Ca^{2+}$ and $Zn^{2+}$. As the metal ions, $Na^+$ and $Zn^{2+}$ are generally used. An ionomer resin partially neutralized with bivalent metal ions containing a polyamide oligomer is also usable. A mixture of those olefin resins is also usable so long as it does not impair the sealing property.

In a laminated film of the present invention, at least one olefin layer can be laminated. If it has two olefin resin layers or more, the olefin resins may be the same or different. The olefin resin layer may be disposed either between the layer (A) and the layer (B), or preferably on one side or both sides of the laminated film of the layers (A) and (B). By laminating the olefin resin layer, it is possible to improve the extrusion property, dimensional stability, etc. and to provide the laminated film with an excellent sealing property.

The laminate of an olefin resin is exemplified by a layer of EVA/adhesive/(B)/(A)/adhesive/EVA, layer of EVA/adhesive/(B)/(A)/adhesive/ionomer resin/, layer of EVA/adhesive/(B)/(A)/adhesive/mixture of LLDPE and EVA, layer of EVA/adhesive/(B)/(A)/adhesive/mixture of VLDPE and LLDPE, layer of VLDPE/adhesive/(B)/(A)/adhesive/VLDPE and layer of (PP+α)/adhesive/(B)/(A)/adhesive/mixture of VLDPE and LLDPE, layer of crystalline propylene-ethylene random copolymer/adhesive/(B)/(A)adhesive/VLDPE, a layer of crystalline propylene-ethylene random copolymer/adhesive/(B)/(A)adhesive/(PP+α). Naturally, the positions of the layers (B) and (A) may be exchanged.

It is possible to add an inorganic additive and/or an organic additive such as a thermoplastic resin, an inorganic filler and a pigment to the layer (A), the layer (B) and the olefin resin layer in such a quantity as not to impair the stretchability and the gas barrier property.

Since the adhesiveness between the layer (A) and the layer (B) is good, no particular adhesive layer is required, but an adhesive layer may be provided, if necessary. In this case, the adhesive layer is preferably provided between the olefin resin layer and the layer (A) or between the olefin layer and the layer (B) so as to improve the adhesiveness.

As the adhesive, an polyolefin or an olefin copolymer which are modified with a carboxylic acid such as fumaric acid and maleic acid is preferable. As examples of the polyolefin or the olefin copolymer to be modified will be cited a homopolymer of ethylene, a bicopolymer or tricopolymer such as an ethylene-propyrene copolymer, an ethylene-vinyl acetate copolymer, an ethylene-acrylate copolymer and an ethylene-methacrylate copolymer, ethylene-vinyl acetate-acrylic acid copolymer, and a compound thereof which does not impair the transparency. A thermoplastic polyurethane resin may also be used.

A sealing layer or the whole layers of such a laminated film may be cross-linked by irradiation such as electron beam irradiation, if necessary. Such cross-linking can provide a good sealing property when the sealing temperature is high, but cross-linking is sometimes disadvantageous when sealing at a low temperature is intended.

A process for producing a laminated film according to the present invention will be described hereinunder.

A laminate of the layer (A) and the layer (B) is first extruded into a tubular shape so that the thickness of the layer(s) (A) is larger than that of the layer(s) (B) by using an annular die equipped with the same number of extruders as the number of the laminated layers. After the layer (A and the layer (B) were separately extruded into films, laminating the layers (A) and (B), that is, laminating them out of die is not preferable because the unsatisfactory adhesion of the films sometimes lowers the stretchability. The tubular laminate is immediately rapidly cooled, and the thus-obtained substantially amorphous tubular film is heated. The film is biaxially stretched to 1.3 to 4.0 times, preferably 1.5 to 3 times in the machine and transverse directions, respectively, by an inflation method, thereby producing a laminated film. The heating temperature is not lower than 60° C. and lower than 100° C., preferably 80° to 95° C. If the heating temperature is lower than 60° C., the stretchability is deteriorated and a change in dimension is increased. On the other hand, if the heating temperature is 100° C. or higher, it is impossible to obtain the desired percentage of heat shrinkage. It is necessary that a heat shrinkable film of the present invention has a percentage of heat shrinkage of not less than 10%, preferably not less than 20% in both machine and transverse directions when the film is immersed in a hot water of 90° C. for 1 minute. If the percentage of heat shrinkage is less than 10%, a wrinkle may be produced on the surface of a packaging film or the close contact between the content and the packaging film is impaired, thereby the external appearance of the goods is deteriorated.

A laminated film of the present invention, which is a biaxially stretched film produced by laminating a mixed resin layer containing an EVOH resin as the main constituent which has well-balanced gas barrier property and stretchability and a mixed aliphatic polyamide resin layer obtained by mixing aliphatic polyamide resins having specific melting points in a specific ratio, can be used as a food packaging film having uniform heat-shrinkability, excellent stretchability and dimensional property.

Since the stretchability of the laminated film of the present invention is excellent, it is possible to obtain uniform heat-shrinkability without the need for excessive stretching and orientation and to obtain practical dimensional stability without heat treatment. In addition, the film does not produce any ply separation during a high-temperature treatment in a sterilization and heat shrinkage process. A laminated film of the present invention also has a good adhesiveness with the content.

The present invention will be explained concretely with reference to the following non-limitative examples.

EXAMPLES 1 TO 7, COMPARATIVE EXAMPLES 1 to 5

Resins shown in Table 1 were separately charged into an annular die by a plurality of extruders, and the laminates having the structures shown in Table 2 were coextruded. Each of the tubular laminates extruded from the die was cooled in a cooling bath of 5° to 20° C., to obtain a tubular laminate having 175 mm in flattened width and 80 to 265 μm in thickness. The tubular laminate was heated for about 6 seconds in a heating bath with the temperature adjusted to the value shown in Table 2 and the heated tubular laminate was stretched to 2.3 times in the machine direction (L) and 2.3 times in the diametrical direction of the tubular laminate. The thus-obtained biaxially oriented film was about 403 mm in flattened width and 15 to 50 μm in thickness.

EXAMPLE 8

Resins shown in Table 1 were separately charged into an annular die by a plurality of extruders, and the laminate having the structures shown in Table 2 was coextruded. The tubular laminate extruded from the die was cooled in a cooling bath of 5° to 20° C., to obtain a tubular laminate 262 mm in flat width and 95 μm in thickness. The tubular laminate was heated for about 6 seconds in a heating bath with the temperature adjusted to the value shown in Table 2 and the heated tubular laminate was stretched to 1.5 times in the machine direction (L) and 1.5 times in the diametrical direction of the tubular laminate. The thus-obtained biaxially oriented film was about 393 mm in flattened width and 42 μm in thickness.

EXAMPLES 9 to 10

Resins shown in Table 1 were separately charged into a ring die by a plurality of extruders, and the laminate having the structures shown in Table 2 was coextruded. The tubular laminate extruded from the die was cooled in a cooling bath of 5° to 20° C., to obtain a tubular laminate 133 mm in flattened width and 378 μm in thickness. In the case of electron beam irradiation (Example 10) the, tubular laminate was irradiated with 500 keV so as to give an exposed dose of about 6 megarads.

The tubular laminate was heated for about 6 seconds in a heating bath with the temperature adjusted to the value shown in Table 2. The heated tubular laminate had been stretched to 3 times in the machine direction (L) and 3 times in the diametrical direction of the tubular laminate. The thus-obtained biaxially oriented film was about 399 mm in flattened width and 42 μm in thickness.

The kinds and physical properties of the resins used in Examples are shown in Table 1, the structures of the layers of the laminated film obtained and the results of the tests on the properties of the film are shown in Table 2, and the methods for the tests on the properties are shown in Table 3.

TABLE 1

| Resin | Abbreviation | Remarks |
|---|---|---|
| Nylon 6-66 copolymer | Ny$^1$ | (Tm): 200° C., CM 6041: produced by Toray Industries, Inc. |
| Nylon 6-12 copolymer | Ny$^2$ | (Tm): 120° C., CA 6: produced by EMS, Ltd. |
| Nylon 6-12 copolymer | Ny$^3$ | (Tm): 190° C., CR 9: produced by EMS, Ltd. |
| Nylon 6-69 copolymer | Ny$^4$ | (Tm): 130° C., produced by EMS, Ltd. |
| Amorphous Nylon | A-Ny | (Tm): none, Sealer PA: produced by Mitsui Du Pont Polychemical, Ltd. copolymer of hexamethylene diamine and telephthalic acid |
| Saponified ethylene-vinyl acetate copolymer | EVOH | (Tm): 164° C., ethylene content: 44 mol %, saponification degree: 99%, EP-E: produced by Kuraray, Co., Ltd. |
| Mixture of saponified ethylene-vinyl acetate/Polyester elastomer | M1 | mixture of EVOH containing 44 mol % of ethylene and a polyester elastomer, mixing ratio about 90/10, produced by Nihon Gosei Kagaku K. K. |
| Mixture of saponified ethylene-vinyl acetate/EVA | M2 | mixture of EVOH containing 44 mol % of ethylene and EVA mixing ratio about 93/7, XEP: produced by Kuraray, Co., Ltd. |
| Mixture of ionomer/polyamide oligomer | IO/NO | metal ion of ionomer: Zn$^{++}$, ionomer (Zn salt), produced by Mitsui Du Pont Polychemical, Ltd. |
| Ionomer | IO | (Tm): 98° C., ionomer (Na salt), AM 7910: produced by Mitsui Du Pont Polychemical, Ltd. |
| Very low-density polyethylene | VLDPE | (Tm): 115° C., density: 0.900, Vicat softening point: 75° C., VL 200: produced by Sumitomo Kagaku Kogyo K. K. |
| Ethylene-α-olefin copolymer | LLDPE | (Tm): 120° C., 4-methyl-pentene-1 as α-olefin, UZ 2021 L: produced by Mitsui Sekiyu Kagaku K. K. |
| Ethylene-vinyl acetate copolymer | EVA | (Tm): 102° C., vinyl acetate content: 5 wt %, HE-60: produced by Mitsubishi Petrochemical Co., Ltd. |
| Carboxylic acid modified ethylene-vinyl acetate-acrylic acid copolymer | H | (Tm): 100° C., EX 401: produced by Mitsui Du Pont Polychemical, Ltd. |

Tm: crystalline melting point

TABLE 2

| | Structure of layers | | | | | | | | | | | |
|---|---|---|---|---|---|---|---|---|---|---|---|---|
| | First layer | | Second layer | | Third layer | | Fourth layer | | Fifth layer | | Sixth layer | |
| | Mixing*$^1$ ratio of resin | Thickness*$^2$ | Mixing ratio of resin | Thickness | Mixing ratio of resin | Thickness | Mixing ratio of resin | Thickness | Mixing ratio of resin | Thickness | Mixing ratio of resin | Thickness |
| Example 1 | Ny$^1$/Ny$^2$ (6/4) | 10 | M$^1$ | 5 | | | | | | | | |
| Example 2 | Ny$^1$/Ny$^2$ (6/4) | 8 | M$^1$ | 4 | Ny$^1$/Ny$^2$ (6/4) | 8 | | | | | | |
| Example 3 | EVA | 4 | H | 1 | M$^1$ | 5 | Ny$^1$/Ny$^2$ (6/4) | 8 | H | 1 | IO | 23 |
| Example 4 | VLDPE | 4 | H | 1 | M$^2$ | 5 | Ny$^1$/Ny$^4$ (7/3) | 8 | H | 1 | IO/NO | 23 |
| Example 5 | EVA | 4 | H | 1 | M$^1$ | 5 | Ny$^3$/Ny$^2$ (9/1) | 8 | H | 1 | LLDPE/EVA (3/7) | 20 |
| Example 6 | EVA | 4 | H | 3 | M$^1$ | 8 | Ny$^1$/Ny$^2$ (65/35) | 9 | H | 3 | EVA | 23 |
| Example 7 | VLDPE | 4 | H | 2 | M$^2$ | 6 | Ny$^1$/Ny$^4$ (7/3) | 12 | H | 2 | VLDPE/LLDPE (9/1) | 20 |
| Example 8 | EVA | 4 | H | 1 | M$^1$ | 5 | Ny$^1$/Ny$^2$ (6/4) | 8 | H | 1 | IO | 23 |
| Example 9 | EVA | 4 | H | 1 | M$^1$ | 5 | Ny$^1$/Ny$^2$ (6/4) | 8 | H | 1 | IO | 23 |
| Example 10*$^3$ | EVA | 4 | H | 1 | M$^1$ | 5 | Ny$^1$/Ny$^2$ (6/4) | 8 | H | 1 | IO | 23 |
| Comp. Example 1 | Ny$^1$ | 10 | EVOH | 5 | | | | | | | | |
| Comp. Example 2 | Ny$^1$/Ny$^4$ (8/2) | 8 | EVOH | 4 | Ny$^1$/Ny$^4$ (8/2) | 8 | | | | | | |
| Comp. Example 3 | EVA | 4 | H | 1 | M$^2$ | 5 | Ny$^1$/A-Ny (5/5) | 8 | H | 1 | LLDPE/EVA (3/7) | 20 |
| Comp. Example 4 | EVA | 4 | H | 1 | M$^2$ | 12 | Ny$^3$/Ny$^2$ (2/8) | 8 | H | 1 | LLDPE/EVA (3/7) | 13 |

TABLE 2-continued

| | | | | | | | | | | | | |
|---|---|---|---|---|---|---|---|---|---|---|---|---|
| Comp. Example 5 | EVA | 4 | H | 1 | M² | 12 | Ny³/Ny² (2/8) | 8 | H | 1 | LLDPE/EVA (3/7) | 13 |

| | Stretching Ratio Machine direction × Transverse direction | Heating Temperature °C. | Stretchability | Percentage of Heat shrinkage L/T % | Dimensional Stability | Gas barrier Property cc/m² · day · atm |
|---|---|---|---|---|---|---|
| Example 1 | 2.3 × 2.3 | 75 | A | 35/35 | B | 90 |
| Example 2 | " | 75 | A | 36/37 | B | 120 |
| Example 3 | " | 90 | A | 33/34 | A | 75 |
| Example 4 | " | 90 | A | 32/32 | A | 85 |
| Example 5 | " | 95 | B | 28/29 | B | 77 |
| Example 6 | " | 90 | A | 30/32 | A | 55 |
| Example 7 | " | 95 | A | 27/28 | A | 65 |
| Example 8 | 1.5 × 1.5 | 90 | A | 30/31 | A | 85 |
| Example 9 | 3 × 3 | 95 | A | 37/36 | A | 70 |
| Example 10*³ | 3 × 3 | 95 | A | 35/35 | A | 95 |
| Comp. Example 1 | 2.3 × 2.3 | 75 | C | 32/34 | D | 85 |
| Comp. Example 2 | " | 75 | B | 33/34 | D | 110 |
| Comp. Example 3 | " | 95 | C | 30/32 | C | 70 |
| Comp. Example 4 | " | 95 | C | 33/34 | D | 45 |
| Comp. Example 5 | " | 55 | D | — | — | — |

*¹Mixing ratio of resins: e.g. Ny¹/Ny² (6/4) represents that the weight ratio of Ny¹ and Ny² is 6:4.
*²Thickness: μm
*³Electron beam irradiation.

TABLE 3

| Property | Method for testing the property |
|---|---|
| 1. Percentage of heat shrinkage | 10 pieces of 10 cm × 10 cm film were immersed into a hot bath of 90° C. for 1 minute in a loose state. The percentage of shrinkage was represented by the average value of each ratios of the longitudinal and transverse lengths of the films to the respective original lengths. |
| 2. Stretchability | A: Very good (scattering of percentage of heat shrinkage is not more than 3%)<br>B: Good (scattering of percentage of heat shrinkage is not more than 7%)<br>C: Stretchable but impracticable due to the production of a small necking and nonuniformity in film thickness<br>D: Difficult to stretch |
| 3. Dimensional stability | The dimensional change of a stretched film of about 1 m long left to stand at 23° C. and 50% RH for 2 weeks was measured.<br>A: Less than 5%. Practicable.<br>B: From not less than 5% to less than 8%. Practicable.<br>C: 8 to 10%. Impracticable.<br>D: 10% or more. Impracticable. |
| 4. Gas barrier property | Represented by the amount of oxygen permeated through the film at 30° C. and 100% RH. |
| 5. Crystalline melting point | Temperature which shows the maximum value of the melting point curve obtained by measuring 10 mg of a sample in the condition raised at a rate of 10° C./min by using a differential scanning type calorimeter (TA-3000: produced by Metler). |

As shown in Examples 1 to 10, it is clear that a heat-shrinkable laminated film according to the present invention is a laminated film which is excellent in stretchability and has uniform heat-shrinkability and dimensional stability.

On the other hand, in Comparative Example 1, since the laminated film consists of a single polyamide resin layer and a single EVOH resin layer, the stretchability is insufficient for producing a film having practicable dimensional stability. In Comparative Example 2, although the mixed polyamide resin layer is the same as in the present invention, since the second layer is a single EVOH resin layer, the dimensional stability is impracticable in spite of having the improved stretchability. In Comparative Examples 3 to 5, although the EVOH resin layer is the same as in the present invention, since the polyamide resin layer of the fourth layer is not in the range of the present invention, it is impossible to obtain uniform stretchability and practicable dimensional stability.

What is claimed is:

1. A heat-shrinkable laminated film of at least two layers comprising:
a mixed aliphatic polyamide resin layer (A) comprising 55 to 90 wt % of an aliphatic polyamide resin having a crystalline melting point of 175° to 240° C. and 45 to 10 wt % of an aliphatic polyamide resin having a crystalline melting point of from not less than 120° C. to less than 175° C., and
a mixed resin layer (B) comprising 70 to 90% of a saponified ethylene-vinyl acetate copolymer and 30 to 1 wt % of a resin selected from the group consisting of a polyester elastomer, a polyamide elastomer, an ethylene-vinyl carboxylate copolymer and an ethylene-acrylate copolymer.

2. The heat-shrinkable laminated film according to claim 1, wherein said aliphatic polyamide resin having a crystalline melting point of 175° to 240° C. is one selected from the group consisting of nylon 6, nylon 69, nylon 610, nylon 612, nylon 6-66, nylon 6-69 and nylon 6-12.

3. The heat-shrinkable laminated film according to claim 1, wherein said aliphatic polyamide resin having a crystalline melting point of from not less than 120° C. to less than 175° C. is one selected from the group consisting of nylon 6-69, nylon 6-12, nylon 6-66-610 and nylon 6-66-610-12.

4. The heat-shrinkable laminated film according to claim 1, wherein the thickness of said layer (A) is 1.1 to 3 times as large as that of said layer (B).

5. The heat-shrinkable laminated film according to claim 1, further comprising at least one olefin resin layer.

6. The heat-shrinkable laminated film according to claim 5, further comprising an adhesive layer disposed between said olefin layer and said layer (A) or between said olefin layer and said layer (B).

7. The heat-shrinkable laminated film according to claim 5, wherein said olefin resin is one selected from a group consisting of a copolymer of ethylene and a vinyl ester monomer, a copolymer of ethylene and a monomer selected from an aliphatic unsaturated carboxylic acid and an aliphatic unsaturated carboxylate, an ionomer resin, a linear low-density polyethylene, a mixed resin of a linear low-density polyethylene and an ethylene vinyl acetate copolymer, a very low-density polyethylene, a mixed resin of a very low-density polyethylene and a small amount of linear low-density polyethylene, and a mixed resin of a crystalline propylene-ethylene random copolymer and a polypropylene elastomer.

* * * * *

UNITED STATES PATENT AND TRADEMARK OFFICE
CERTIFICATE OF CORRECTION

PATENT NO. : 4,963,426
DATED : October 16, 1990
INVENTOR(S) : Yoshiharu NISHIMOTO, et al It is certified that error appears in the above-identified patent and that said Letters Patent is hereby corrected as shown below:

IN THE CLAIMS:

Claim 1, column 10, line 9, change "70 to 90%" to read --70 to 99%--.

Signed and Sealed this

Second Day of June, 1992

Attest:

DOUGLAS B. COMER

Attesting Officer

Acting Commissioner of Patents and Trademarks